United States Patent
Hoshikawa et al.

(10) Patent No.: US 6,637,798 B2
(45) Date of Patent: Oct. 28, 2003

(54) FRONT BODY STRUCTURE OF VEHICLE

(75) Inventors: Akira Hoshikawa, Tokyo (JP); Tadashi Masuda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/183,689

(22) Filed: Jun. 25, 2002

(65) Prior Publication Data
US 2003/0001407 A1 Jan. 2, 2003

(30) Foreign Application Priority Data
Jun. 29, 2001 (JP) .................................. 2001-198548

(51) Int. Cl.[7] .............................. B60J 1/20; B60S 1/04; B62D 25/08
(52) U.S. Cl. ................................ 296/96.17; 296/96.15; 296/189; 15/350.3; 15/350.31
(58) Field of Search ........................ 296/96.15, 96.17, 296/188, 189; 15/250.3, 250.31, 250.27

(56) References Cited

U.S. PATENT DOCUMENTS 3,788,681 A * 1/1974 Barenyi et al. ............. 296/192
3,793,671 A * 2/1974 Gebhard ................... 15/250.01
3,940,176 A * 2/1976 Ito et al. ...................... 296/188
4,718,712 A * 1/1988 Nakatani ..................... 296/192
5,127,703 A * 7/1992 Takahashi ................... 296/192
6,193,304 B1 * 2/2001 Takahashi et al. .......... 296/192
6,216,309 B1 * 4/2001 Goto et al. ............... 15/250.31
6,364,570 B1 * 4/2002 Egner-Walter .............. 403/348

FOREIGN PATENT DOCUMENTS

JP        8-6641      2/1996    ............. B60S/1/24
JP        9-95261     4/1997    ............. B62D/25/08

* cited by examiner

Primary Examiner—D. Glenn Dayoan
Assistant Examiner—Patricia Engle
(74) Attorney, Agent, or Firm—Darby & Darby

(57) ABSTRACT

A motor bracket is installed in a concave portion formed in a front bulkhead of a vehicle and onto an upper surface of which a wiper motor unit 19 is fixed. The bracket is fixed to a front wall surface of the front bulkhead and is operable to deform or fracture based upon an impact to the front wall surface during a collision. In addition, the wiper motor unit is positioned at a higher position than that of upper end surfaces of strut towers so that the concave portion can be crashed and deformed without interference from the wiper motor even if the strut towers are moved backwardly at the time of frontal crash of the vehicle to push the front wall surface of the front bulkhead. As a result, the impact energy generated from a frontal crash can be absorbed.

7 Claims, 5 Drawing Sheets

FRONT BODY STRUCTURE OF VEHICLE

BACKGROUND OF THE INVENTION

The present invention relates to a front body structure of a vehicle (such as a "car") in which an impact energy generated during a crash can be absorbed effectively by a front bulkhead, therefore promoting passenger safety. More particularly, the present invention relates to the front body structure in which wiper units are arranged on the front bulkhead such that the wiper units do not interfere with a collapse of the front bulkhead during a collision.

In the related art, such as disclosed in a Japanese Patent Unexamined Publication No. Hei. 9-95261, a front bulkhead is arranged along a lower edge portion of front windshield of a vehicle in a widthwise direction thereof so as to partition an engine room from a passenger compartment. In addition, a concave portion is opened upwardly and formed in the front bulkhead. A wiper unit is provided in the concave portion.

As the wiper unit, a modular wiper unit disclosed in Japanese Utility Model Examined Publication No. Hei. 8-6641, for example, is often employed. In the wiper unit of this type, in many cases a motor bracket used to fix the wiper motor to the front bulkhead is fixed to the inside of the concave portion of the bulkhead such that the motor bracket extends in the longitudinal direction of the vehicle.

However, when the vehicle collides head-on with an obstacle in front of the vehicle as the vehicle is moving forward, often at a high speed (referred to as the "frontal crash" hereinafter), naturally, a large impact load (shock) is applied to a vehicle body from a front side. Then, the impact energy generated at that time is transmitted to a rear side of the vehicle via a front portion of the vehicle. In response, respective constituent parts provided in the front portion of the body are plastically deformed to absorb the impact energy.

Of course, if the impact load is transmitted to the bulkhead, the bulkhead is crashed to absorb the impact energy, so that an impact energy transmission into the compartment is reduced.

However, in a structure disclosed in the above Publication, since the motor bracket is fixed to the concave portion of the bulkhead such that the motor bracket extends in the longitudinal direction, the motor bracket acts inevitably as a reinforcement to the bulkhead. In addition, since the wiper motor is arranged at a lower position than that of upper surfaces of a strut towers that are arranged on both right and left sides of the front bulkhead, the wiper motor interferes with retreating strut towers to disturb the crash of the bulkhead. For this reason, the portion of the bulkhead to which the wiper motor is arranged becomes difficult to be locally crashed. Thus, there is a disadvantage in that the effect of absorbing the impact energy generated by the deformation of the bulkhead cannot be sufficiently achieved.

Also, since the wiper motor has a rigid body, a large reaction force is generated by the wiper motor when the impact load is applied to the wiper motor from the upper side of the vehicle. Therefore, the structure of the related art is less than ideal for reducing or eliminating the transmission of the impact energy to the passenger compartment.

SUMMARY OF THE INVENTION

The present invention has been made in view of above circumstances, and it is an object of the present invention to provide a front body structure of a vehicle that can effectively absorb an impact energy which is transmitted to a rear side of the vehicle, by accelerating a crash of a bulkhead by an impact load applied during a collision of the vehicle. Thus, the present invention is for effectively protecting passengers from an impact applied during the collision, and also for absorbing the impact energy to prevent a generation of a large reaction force even when the impact load is applied to a wiper motor from an upper side of the vehicle body.

In order to achieve the above object, the present invention provides a body structure of the vehicle comprising the bulkhead including a concave portion opened upwardly. The concave portion has front and rear wall surfaces and a wiper unit having a wiper motor is disposed between the front and rear wall surfaces of the concave portion. Further, the wiper motor is also disposed at a higher position than that of upper surfaces of strut towers of the vehicle.

According to such structure, the strut towers are moved toward the rear side of the vehicle by the impact energy at the time of the frontal crash to push the bulkhead. At this time, since the wiper motor is arranged at the higher position than that of the upper surfaces of the strut towers, such retreating strut towers can accelerate the crash of the bulkhead toward the rear side of the vehicle without an interference from the wiper motor.

In this case, preferably the wiper motor is fixed to the front bulkhead via a motor bracket, an inclined portion of which is bent downwardly and formed in front of the wiper motor. A lower end of the inclined portion is fixed to a front portion of the concave portion of the front bulkhead, and a weakening portion is provided in the inclined portion. Therefore, the crash of the bulkhead toward the rear side of the vehicle by the frontal crash can be accelerated even further. Also, the motor bracket can be easily broken if the impact load is applied to the wiper motor from the upper side of the vehicle. As a result, the impact energy can be absorbed effectively.

DETAILED DESCRIPTION OF THE PREFERRED EMBODIMENT

Figure 1:
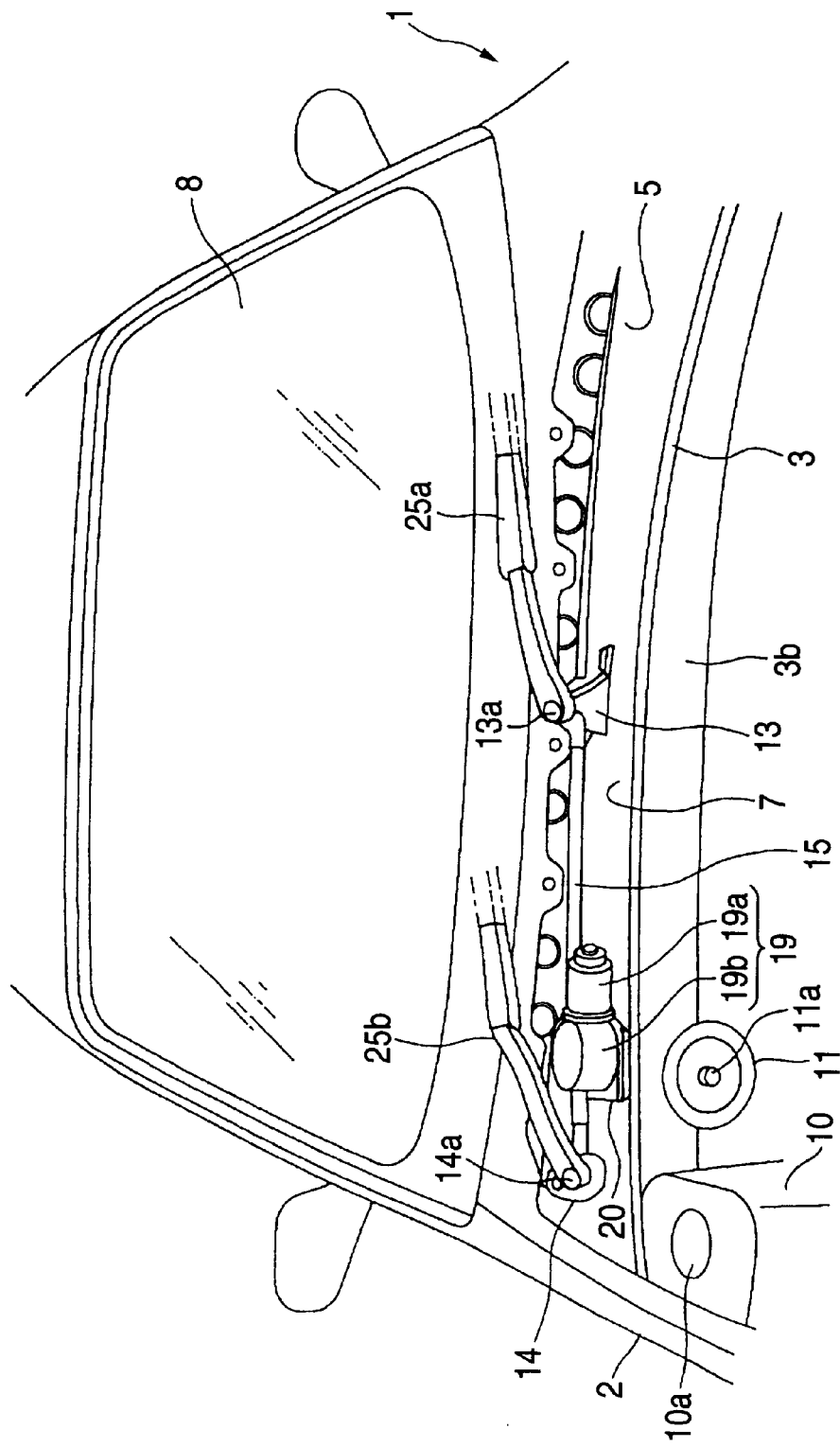
FIG. 1 is a perspective view showing a front portion of a vehicle without a front hood and a cowl panel.
Figure 2:
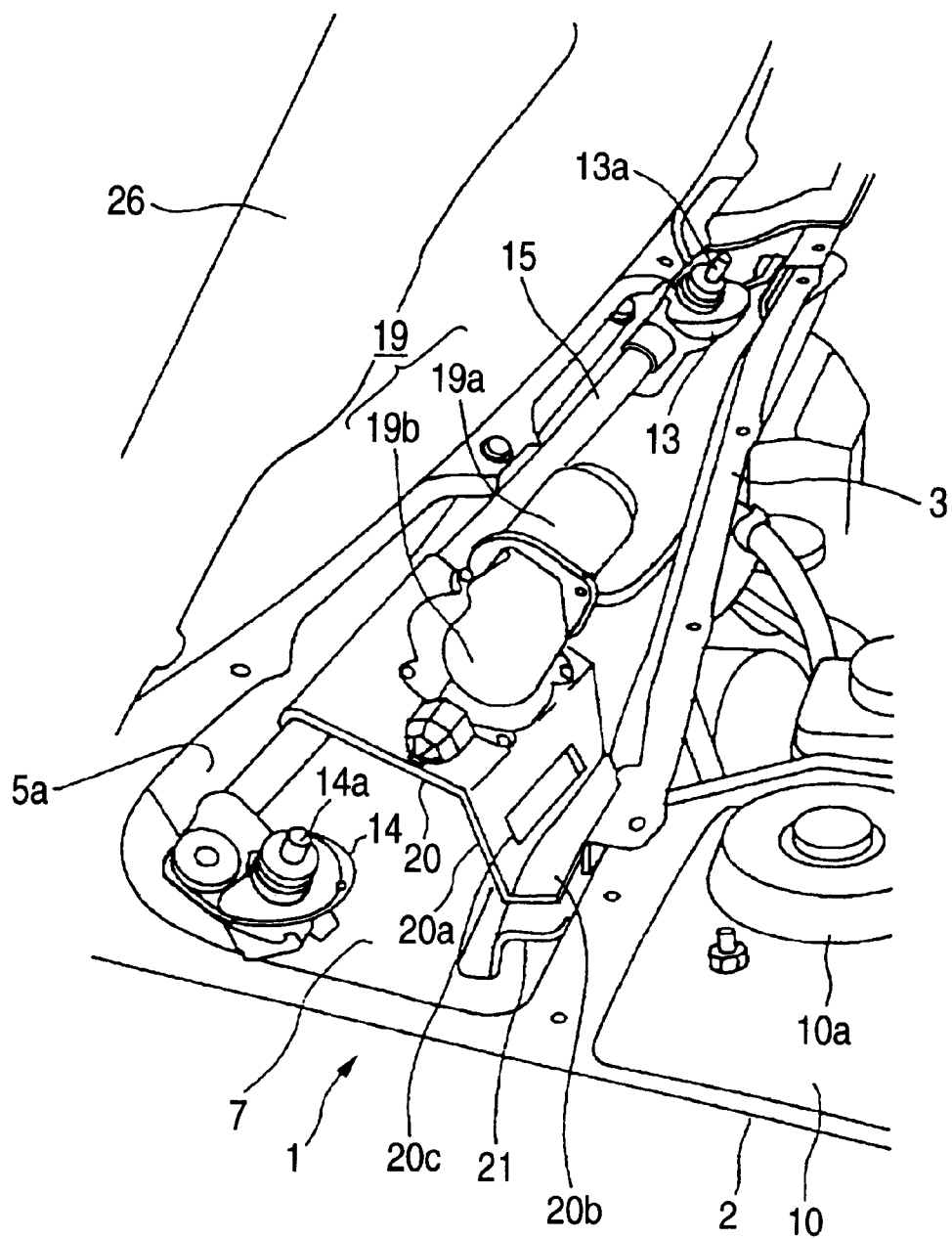
FIG. 2 is a perspective view showing a right side portion of the front portion of the vehicle in the situation where the front hood is opened.

An embodiment of the present invention will be explained with reference to drawings hereinafter. FIG. 1 is a perspective view showing a front portion of a vehicle except for a front hood and a cowl panel. FIG. 2 is the perspective view showing a right side portion of the front portion in the situation that the front hood is opened.

In FIG. 1, reference 1 denotes a front body portion of a vehicle. Front wheel aprons 2 are provided on both sides of the front body portion 1 in a vehicle widthwise direction. A longitudinal wall is formed on both sides of an engine room by the front wheel apron 2 in the vehicle widthwise direction. In this case, only the front wheel apron 2 on the right side of the body is shown in FIG. 1. Also, although not shown, toe boards are arranged under a front bulkhead 3.

Figure 6:
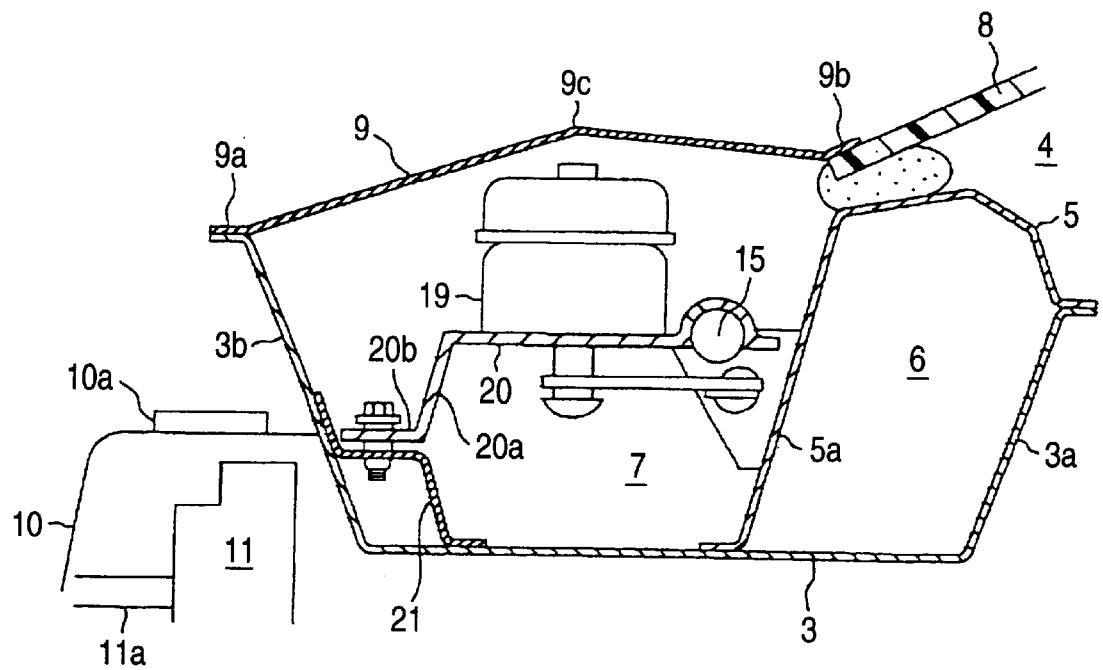
FIG. 6 is a sectional view showing the front portion of the vehicle in FIG. 1.

The front bulkhead 3 is formed in a concave shape that is opened upwardly. A reinforcement 5 is arranged at the back of the front bulkhead 3 along the widthwise direction. An air duct 6 that extends in the widthwise direction is formed by a reinforcement 5 and a rear wall surface 3a of the front bulkhead 3. Also, a concave portion 7 opened upwardly is formed by a front wall surface 3b of the front bulkhead 3 and a front wall surface 5a of the reinforcement 5. In addition, as shown in FIG. 6, a lower edge portion of a front glass (windshield) 8 is fixed to an upper surface of the reinforcement 5, and an upper surface of the concave portion 7 is closed by a cowl panel 9. A front edge portion 9a of the cowl panel 9 is fixed to an upper end surface of the front wall surface 3b of the front bulkhead 3 and a rear edge portion 9b is fixed to a lower edge portion of the front glass 8. Further, a bent portion 9c that can be bent upwardly is formed in the longitudinally middle portion of the cowl panel 9 along the vehicle widthwise direction.

Further, as shown in FIGS. 1 and 2, strut towers 10 are arranged in front of the front bulkhead 3 and on both sides thereof in the vehicle widthwise direction and on the inside of the front wheel apron 2. In FIGS. 1 and 2, only the right strut tower 10 is illustrated. As an upper surface of the strut tower 10, a strut fitting plane 10a to a lower surface of which a strut upper end of a front suspension is fixed via such an elastic member as a rubber is fixed. Also, rear portions of the strut towers 10 are coupled to both sides of the front wall surface 3b of the front bulkhead 3.

A reference 11 denotes a brake masterback which integrally includes a brake master cylinder 11a and of which rear surface is supported by the toe board (not shown). A reference 26 in FIG. 2 is a front hood.

Figure 3:
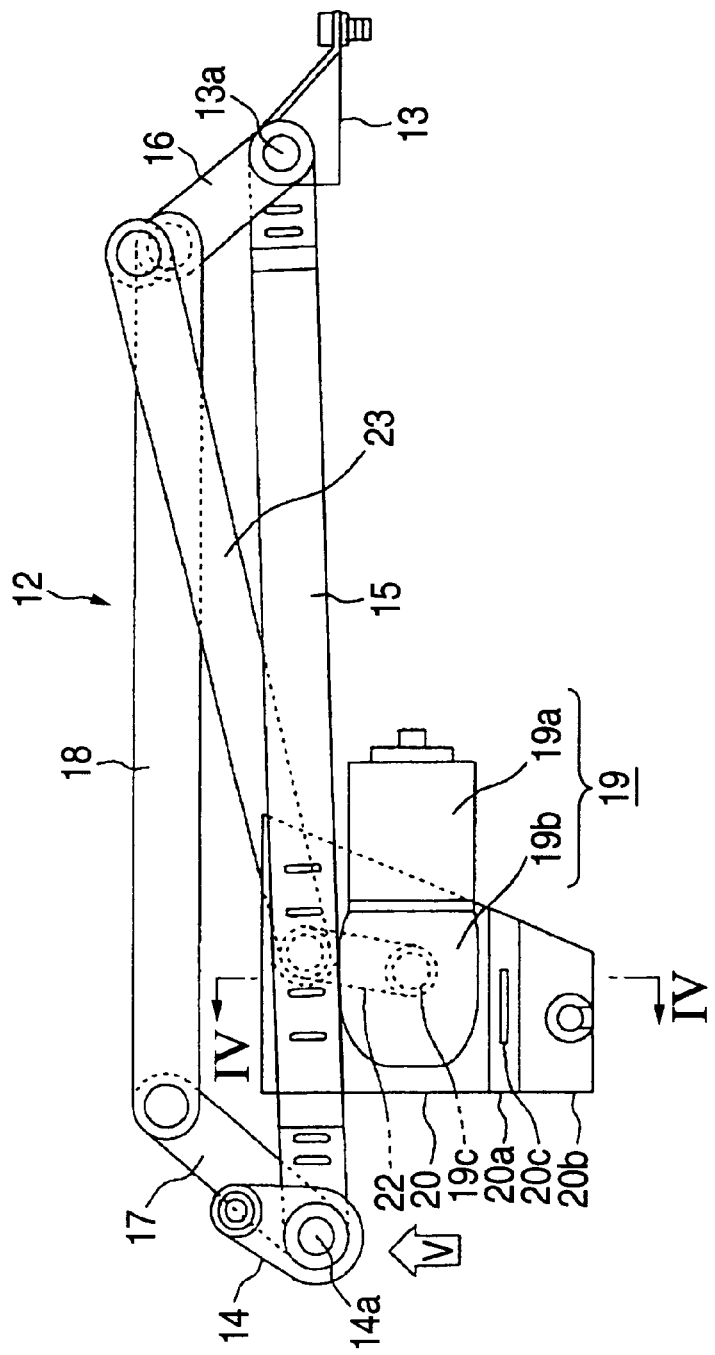
FIG. 3 is a plan view showing a modular wiper unit.
Figure 5:
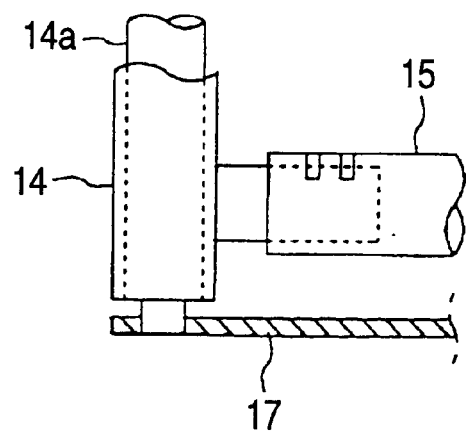
FIG. 5 is a front view showing the modular wiper unit, viewed from an arrow V in FIG. 3.

Also, a modular wiper unit (abbreviated as a "wiper unit" hereinafter) 12 is installed in the concave portion 7 formed in the front bulkhead 3. One configuration of the wiper unit 12 is explained with reference to FIG. 3 hereunder. As shown in FIG. 3, pivot holders 13, 14 are arranged on both sides of the wiper unit 12, and both pivot holders 13, 14 are fixed integrally to both ends of a connection pipe 15 respectively by caulking, or the like (see FIG. 5). Also, left and right pivot shafts 13a, 14a are supported rotatably to the pivot holders 13, 14 respectively. Then, left and right wiper levers 16, 17 are pivotably coupled to both pivot shafts 13a, 14a respectively, and both wiper levers 16, 17 are connected via a wiper rod 18.

In addition, a motor bracket 20 to an upper surface of which a wiper motor unit 19 is fixed is arranged in front of the right side (the driver's seat side) of the body. A rear portion of the motor bracket 20 is fixed to the connection pipe 15 by caulking, or the like. Also, an inclined portion 20a that is inclined downwardly is formed integrally and positioned ahead of the portion to which the wiper motor unit 19 of the motor bracket 20 is fixed. In addition, a flange portion 20b is formed integrally with the inclined portion 20a. The flange portion 20b is fixed to a supporting bracket 21 fixed to the front portion of the front bulkhead 3. Further, a hole portion 20c, as a weakening portion, is opened laterally, such as in an oblong shape, in the inclined portion 20a of the motor bracket 20.

In the present embodiment, the motor bracket 20 may be die-cast molded using, for example, aluminum alloy, or the like as the material, and have relatively hard and fragile material properties. Accordingly, if a load is applied to the flange portion 20b from the front side of the body, a bending moment is concentrated into the edge portion between the flange portion 20b and the inclined portion 20a, or the edge portion between the inclined portion 20a and the upper surface, and thus any one of the edge portions is subjected to brittle fracture. Also, if the load is applied to the motor bracket 20 from the upper side, the stress is concentrated into the periphery of the hole portion 20c since the hole portion 20c is cut through in the inclined portion 20a, and thus, the inclined portion 20a is subjected to brittle fracture from the periphery of the hole portion 20c.

Further, the wiper motor unit 19 has a motor main body 19a and a reduction gear 19b integrally combined. A motor lever 22 that is coupled to an output shaft 19c of the reduction gear 19b is connected to a left wiper lever 16 via a motor rod 23. In addition, the pivot holders 13, 14 of the wiper unit 12 are fastened to a bracket (not shown), which is provided to the reinforcement 5 (or the body frame) to project therefrom, by the bolts and are fixed thereto.

Then, a driving force of the motor main body 19a is transmitted to the pivot shafts 13a, 14a, which are supported by the left and right pivot holders 13, 14, via the motor lever 22, the motor rod 23, the wiper rod 18, and both wiper levers 16, 17 to swing reciprocally the left and right pivot holders 13, 14. As a result, left and right wiper arms 25a, 25b (see FIG. 1) fixed to the pivot shafts 13a, 14a are swung to reciprocally wipe, so that a surface of the front glass 8 can be wiped by wiper blades (not shown) that are provided to top ends of the left and right wiper arms 25a, 25b. In this case, the wiping operation of the wiper unit 12 is similar to that in the related art.

Figure 4:
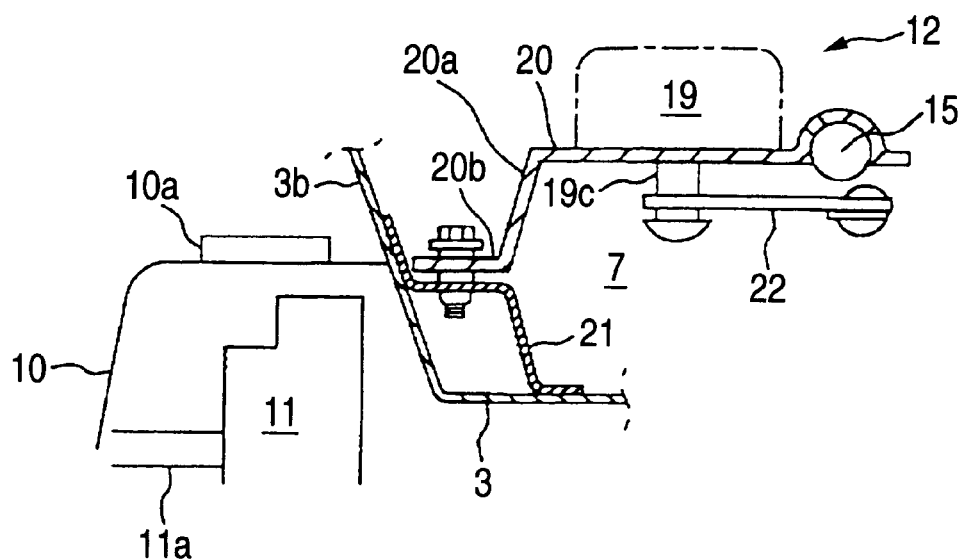
FIG. 4 is a sectional view showing a modular wiper unit, taken along a IV—IV line in FIG. 3.

Also, as shown in FIGS. 4 and 6, the wiper motor unit 19 is fitted at a higher position than or above that of the upper surfaces of the strut tower 10 and the brake masterback 11. In detail, the plane on which the wiper motor unit 19 of the motor bracket 20 exists is set to the higher position than that of the upper end surfaces of the strut tower 10 and the brake masterback 11, and also the flange portion 20b is set to almost the same height as the upper end surface of the strut tower 10.

An operation of the embodiment having the above structure will be explained hereunder. If the strut towers 10 are moved toward the rear portion of the vehicle at the time of a frontal crash of there, the strut towers 10 are pushed against the front wall surface 3b of the front bulkhead 3.

Accordingly, the flange portion 20b, which is fixed to the front wall surface 3b of the front bulkhead 3 via the supporting bracket 21 and provided to the front end of the motor bracket 20, is pushed. At this time, the flange portion 20b of the motor bracket 20 is connected to the upper surface, onto which the wiper motor unit 19 is fixed, via the inclined portion 20a. Therefore, if the flange portion 20b of the motor bracket 20 is pushed toward the rear portion of the vehicle, the stress is concentrated into the edge portion between the flange portion 20b and the inclined portion 20a of the motor bracket 20, or the edge portion between the inclined portion 20a and the upper surface, and thus any one of these edge portions may be broken by brittle fracture. In this case, a state where the edge portion between the inclined portion 20a and the upper surface is broken by brittle fracture is shown in FIG. 7.

Then, the reinforcement of the front bulkhead 3 by the motor bracket 20 in the longitudinal direction is released, and accordingly, the portion of the front bulkhead 3 constituting the concave portion 7 is crashed and deformed. At the same time, the cowl panel 9 of which front end portion 9a is fixed to the upper end of the front wall surface 3b of the front bulkhead 3 is pushed backwardly, and then this cowl panel 9 is bent around the bent portion 9c, which is formed in the middle of the cowl panel 9 in the longitudinal direction, and then deformed.

Figure 7:
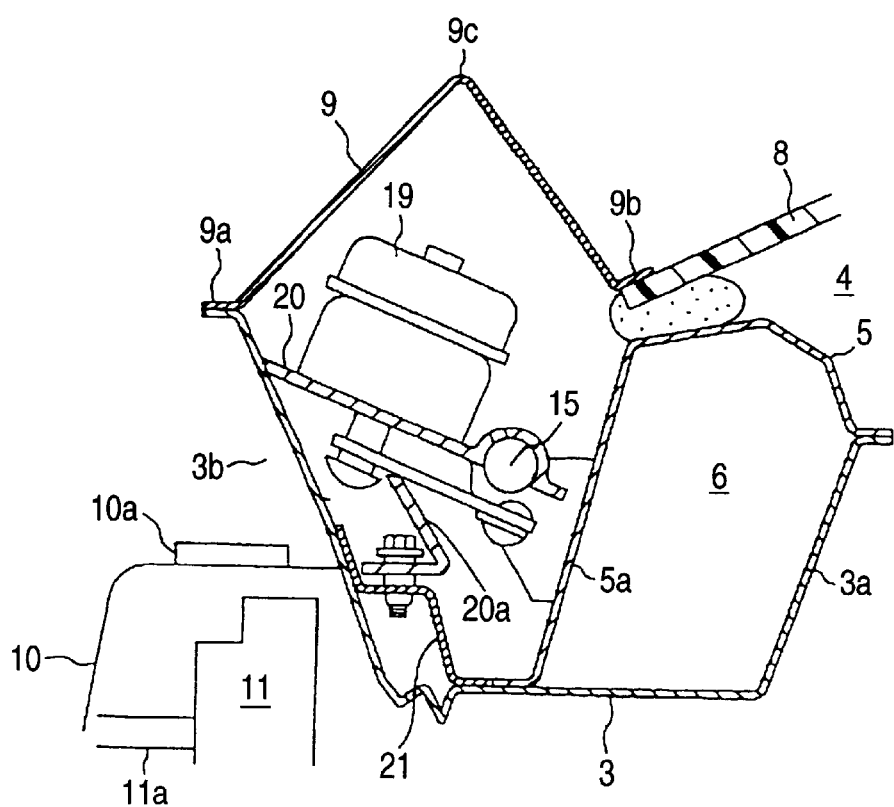
FIG. 7 is a sectional view showing a brittle fracture state of the front portion of the vehicle in FIG. 6.

Since the wiper unit 19 arranged in the concave portion 7 is fitted to the higher position than that of the upper end surfaces of the strut tower 10 and the brake masterback 11, the wiper motor unit 19 that is fixed to the motor bracket 20 is rotated upwardly around the connection pipe 15, as shown in FIG. 7. Thus, even if the concave portion 7 is crashed toward the rear side of the vehicle because of the retreat of the strut tower 10 and the brake masterback 11, the crash of the concave portion 7 can be accelerated without an interference of the wiper motor unit 19 with the strut tower 10 and the brake masterback 11. As a result, the impact energy applied from the front side of the vehicle can be absorbed by the plastic deformation of the front bulkhead 3 and the cowl panel 9.

In this manner, according to the embodiment, if the impact load applied at the time of a frontal crash is transmitted to the front bulkhead 3 by the retreat of the strut tower 10, the crash of the concave portion 7 can be accelerated since the inclined portion 20a of the motor bracket 20 that is installed in the concave portion 7 formed in the front bulkhead 3 is broken and also the wiper motor unit 19 does not interfere with the strut tower 10. For this reason, the impact energy can be absorbed effectively in front of the air duct 6 and thus, the passengers can be protected effectively from the impact.

Also, since the impact energy at the time of the frontal crash is absorbed by the deformation of the front bulkhead 3, the reinforcement structure required to prevent the deformation of the compartment can be simplified which allows for a lighter weight to be achieved. Also, a reduction in production costs can be realized by simplification of the structure.

In addition, if the impact load is applied to the wiper motor unit 19 from the upper side, the stress can be concentrated into the periphery of the hole portion 20c since the hole portion 20c is formed in the inclined portion 20a of the motor bracket 20 to which the wiper motor unit 19 is fixed. Therefore, the inclined portion 20a is broken by brittle fracture.

As a result, the wiper motor unit 19 and the motor bracket 20, onto which the wiper motor unit 19 is fixed, are turned downwardly around the connection pipe 15 by the impact load applied from the upper side of the vehicle. Thus, a large reaction force is never transmitted upwardly from the wiper motor unit 19 and accordingly, the impact energy can be absorbed effectively.

The present invention is not limited to the above embodiment. For example, the motor bracket 20 need not be formed by the die-cast molding, but may be formed by a sheet metal. Also, the embodiment described above is not limited to use of the modular wiper unit, but, for example, a component wiper unit may be used instead. In addition, the strut tower is not limited to the case where the strut tower is provided in front of the front bulkhead, but the strut tower may also be provided under the front bulkhead.

As described above, according to the present invention, the crash of the bulkhead by the impact load at the time of the frontal crash can be accelerated, and thus the impact energy that is transmitted to the rear side of the vehicle can be absorbed effectively by the front bulkhead. Therefore, the passengers can be protected effectively from the impact applied at the time of the frontal crash.

Also, even if the impact load is applied to the wiper motor from the upper side of the vehicle, the large reaction force is never generated upwardly since the wiper motor can be moved so as to escape from the impact load. Therefore, the impact energy can be absorbed effectively.

While there has been described in connection with the preferred embodiments of the present invention, it will be understood to those skilled in the art that various changes and modifications may be made therein without departing from the present invention, and it is aimed, therefore, to cover in the appended claims all such changes and modifications as fall within the true spirit and scope of the present invention.

What is claimed is:

1. A body structure of vehicle comprising:
   a bulkhead including a concave portion opened upwardly and having front and rear wall surfaces; and
   a wiper unit having a wiper motor disposed between the front and rear wall surfaces of the concave portion,
   wherein the wiper motor is also disposed at a higher position than that of upper surfaces of strut towers of the vehicle.

2. The body structure according to claim 1, further comprising:
   a motor bracket with the wiper motor fixed to a bulkhead of said motor bracket and including an inclined portion bent downwardly and disposed to a front of the wiper motor with a weakening portion.

3. The body structure according to claim 2, wherein:
   the bracket is made of an aluminum alloy material and is formed by a molding process.

4. The body structure according to claim 1, wherein the wiper motor is fixed to the bulkhead with a bracket being fracturable by a predetermined load.

5. The body structure according to claim 1, further comprising:
   a cowl panel,
   a first end of the cowl panel fixed to an upper end surface of the front wall surface; and
   a second end of the cowl panel fixed to a lower edge portion of a front windshield of the vehicle, the cowl panel further including a bent portion formed in a longitudinally middle portion of the cowl panel that is operable to be bent upwardly in reaction to a rearward movement of the front wall surface.

6. A body structure of a vehicle comprising:
   an energy absorption component being operable to absorb an impact energy during a collision so as to reduce an impact energy into a passenger compartment; and
   a wiper unit having a wiper motor disposed between the energy absorption component and the passenger compartment without interfering with a collapse of the energy absorption component by the wiper motor.

7. A body structure of a vehicle comprising:
   an energy absorption component being operable to absorb an impact energy during a collision so as to reduce the impact energy into a passenger compartment; and
   a wiper unit having a wiper motor disposed between the energy absorption component and the passenger compartment, wherein the wiper motor is fixed to the energy absorption component with a bracket being operable to deform or fracture at a predetermined load.

* * * * *